Sept. 30, 1952     H. O. SCHJOLIN     2,612,061
POWER TRANSMISSION

Filed Aug. 3, 1945     5 Sheets-Sheet 2

Inventor
Hans O. Schjolin
By Blackmore, *Smart* Oliver
Attorneys

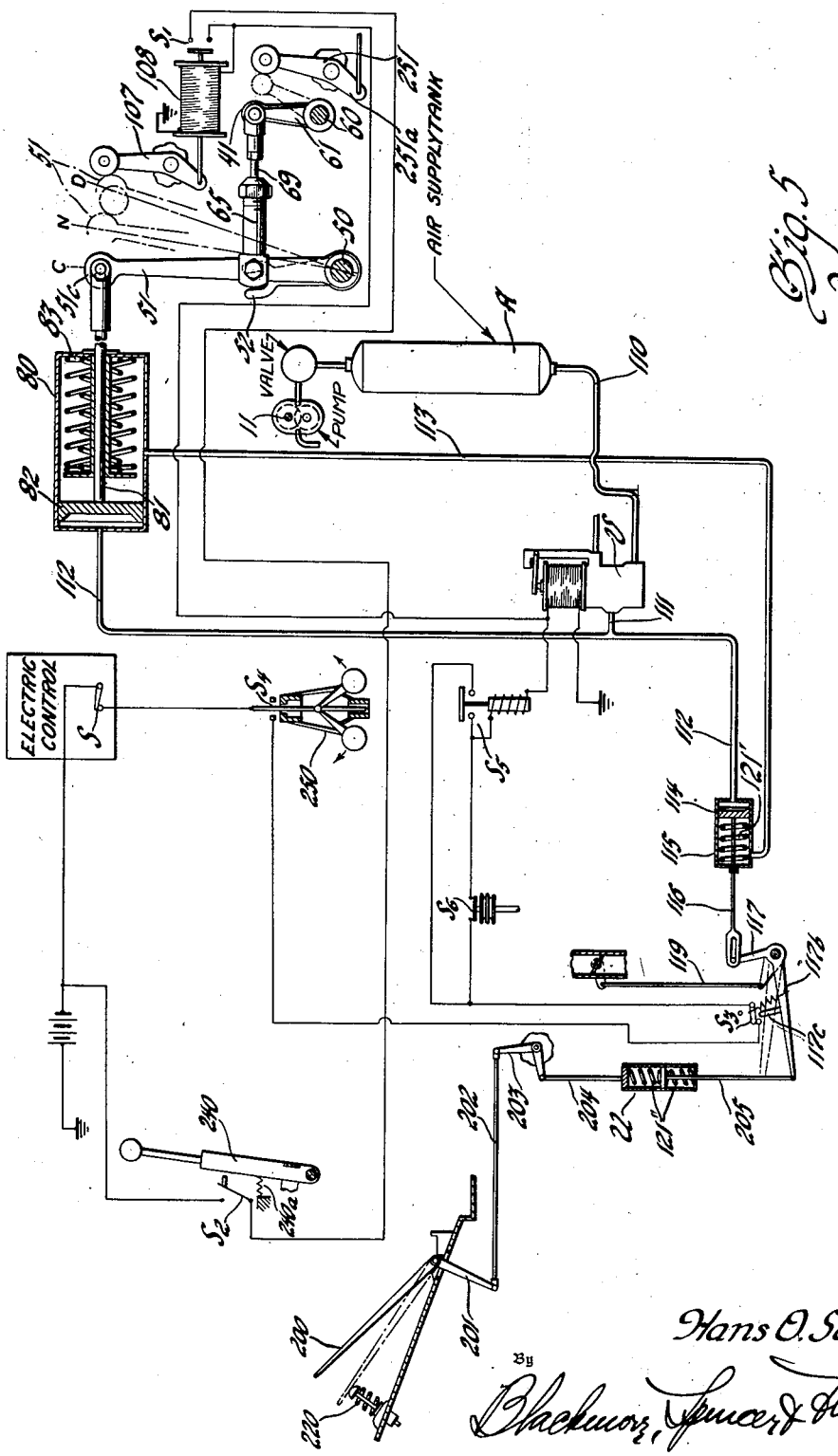

Sept. 30, 1952      H. O. SCHJOLIN      2,612,061
POWER TRANSMISSION
Filed Aug. 3, 1945      5 Sheets—Sheet 5
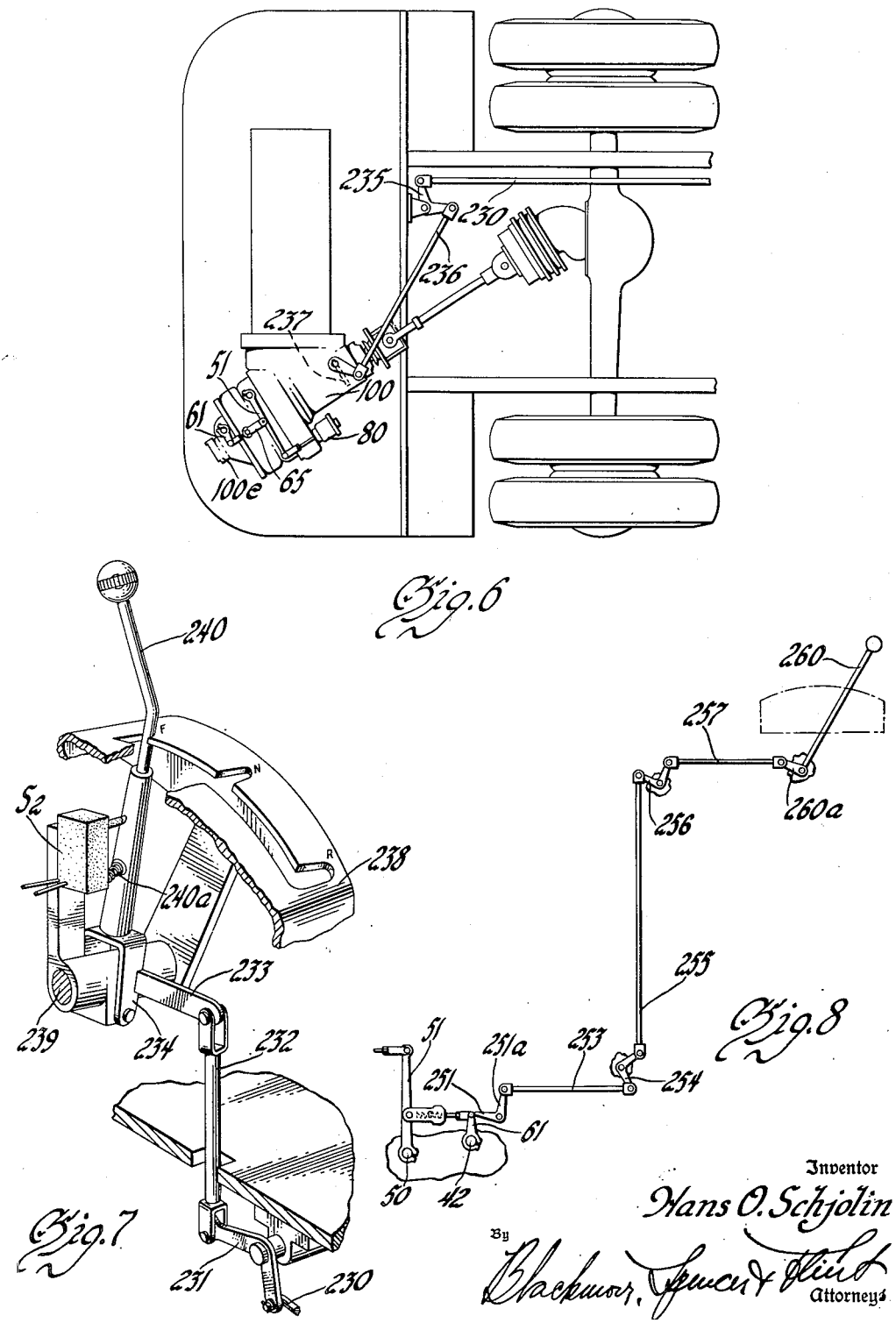

Patented Sept. 30, 1952

2,612,061

UNITED STATES PATENT OFFICE 2,612,061

POWER TRANSMISSION

Hans O. Schjolin, Birmingham, Mich., assignor to General Motors Corporation, Detroit, Mich., a corporation of Delaware Application August 3, 1945, Serial No. 608,787

28 Claims. (Cl. 74—645)

This invention relates to motor vehicles, and in particular to those in which the power plant assemblies are located at the rear for higher efficiency in power transmission and for compact and accessible mechanism, this equipment being for large vehicles such as busses, trucks and tractors.

The invention relates, in part to an arrangement of the drive mechanism wherein the engine is transversely mounted, parallel to the driving axle, and the intervening variable speed transmission which may include a fluid torque converter is placed at an angle between them, and taken for best efficiency and accessibility. It relates further to the selective controls for such an assembly in which there is driver's choice between manual and automatic operation.

It is an object of the invention to provide a positive coupling mechanism which shall enable the operator to maintain control of the vehicle at all times and under all road circumstances while being enabled to enjoy automatic selection of drive speed ratio, as distinct from other devices wherein freewheeling couplings and effects have eliminated the engine braking factor. As a supplemental object, the present disclosure provides interconnecting means with the other controls for transmission speed ratio, which assure the correct conditions for the operation of the said positive drive coupling.

An additional object is to provide in the transmission mechanism, means for complete decoupling of the reverse driving train during forward drive, preventing waste of power and churning of the transmission lubricant. It is likewise an object of the invention to decouple the counter gear or reduction drive train positively during forward running which has the same advantages.

A further object of the invention is to provide automatic forward drive ratio control which shall operate by selective actuation of friction clutch members and by jaw clutch members with interlocking means between manual and automatic controls for the members, safeguarding completely against loss of the control operation by the driver, as stated above, and which shall eliminate automatically, a shift into the higher speed ratio when the driving conditions and torque demand are both low. This interlocking control is believed important.

An additional object is the provision of a manual control which operates to prevent release of, and to sustain the engagement of the direct coupling clutch of the assembly, when desired, for driving in mountainous country, which control enables the hydraulic drive portion of the mechanism to function as a brake.

Further and additional objects and advantages will appear in the specification and description of operation herewith.

Figure 5 is a schematic diagram of the automatic and manual control system with especial reference to the superimposed controls for the link structures of Figs. 2 and 3.

Figure 6 shows in outline the general arrangement of a drive assembly equipped with the invention, showing in particular its external control linkages necessary to carry out the operational sequences of the Fig. 5 controls.

Figure 7 is a perspective view in part section of the forward and reverse selecting mechanism controlling a portion of the linkage shown in Fig. 6, and located in the driver's station.

Figure 8 is a schematic view of a structure to be added to that shown in the other figures for the purpose of providing assured extra braking effect for operation in hilly country.

Figure 1:
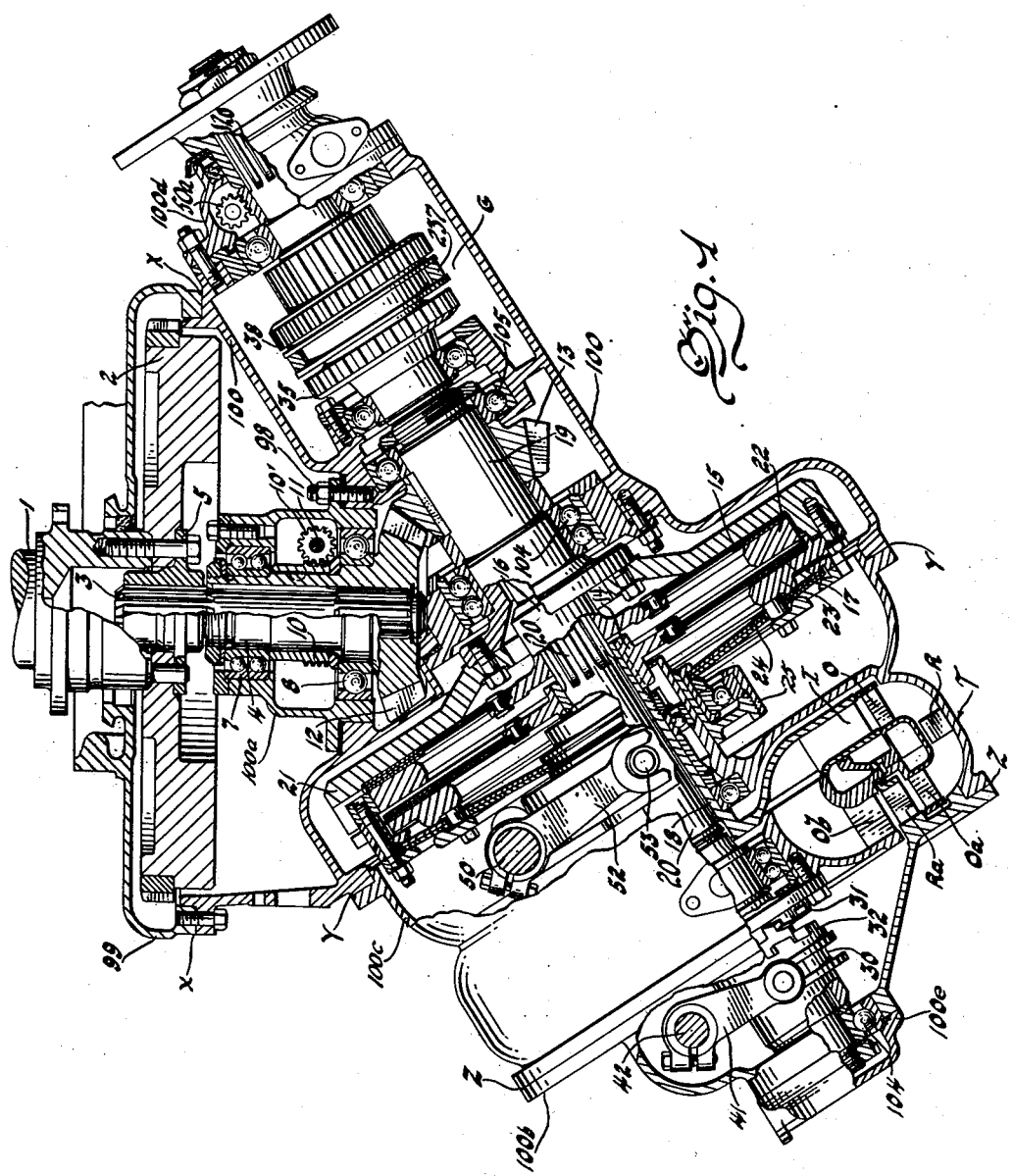
Figure 1 is a longitudinal sectional view of the transmission assembly of the invention, resembling the structure of my Serial No. 507,204 filed October 21, 1943, but differing therefrom in certain important particulars as will be understood further.

In Fig. 1 the engine shaft 1 is attached to flywheel 2 and its flange is bolted to the input bevel gear jackshaft flange 5 splined at 3 to the jackshaft 4, the latter being supported in bearings 7 and 8. Worm gears 10, 10' drive cross-shaft 11, driving the supply pump P as shown in Fig. 1 directly from the engine. Jackshaft bevel teeth 12 overhang into a space formed by portions of the housings 100 and 100a. The engine casing 99 is bolted to housing 100 at X—X, and the jackshaft housing 100a is supported in housing 100 by bolts 98. Housing 100 encloses the drive gear assembly G and the transmission input bevel gear 13 meshing with 12.

The turbine and clutch housing 100c parts at Y—Y. The end plate 100b is bolted to 100c at Z—Z. The rear output drive portion of the gear housing 100 is closed by end-plate 100d.

The cap 100e holds the end bearing for the transmission in place. Jackshaft housing 100a is bolted to casing 100. The assembly of 99, 100, 100a, 100b, 100c, 100d and 100e provides a substantial and sturdy alignment of the centers of the shafting and rotating parts, the whole assembly being rigid with the engine.

The transmission shaft 20 is the input member for the forward and reverse gear, and is mounted in bearings 104 and 105. Shaft 20 is splined for clutch hub 16 of direct drive clutch plate 15, and splined for jaw clutch slider 30.

Power input sleeve 19 is fixed to bevel gear 13 and is bolted to clutch drum 21 having presser plate 22 operated between the inner face of the web of drum 21 and attached fulcrum ring 23. Disc spring 24 is shifted by movement of the bearing collar 25 to cause plate 22 to grip plate 15 for rotation with the input drum 21, or to grip clutch plate 17 mounted on clutch hub 14 which is splined to sleeve 18 attached to turbine impeller I.

This friction clutch system is shown in my Letters Patent U. S. 2,341,163, issued February 8, 1944.

Sleeve 19 is attached to drum 21, having the movable plate 22 for shifting the clutch gripping force to pinch clutch driven plate 15 of solid shaft 20, or release same and clamp plate 17 of hollow shaft 18. The torque converter T consists of an input impeller I, output turbine rings O, $O_a$ and $O_b$ and reaction vane ring R, and $R_a$. Impeller I is attached to hollow shaft 18 of clutch plate 17; the output turbine rings O, $O_a$ and $O_b$ are attached to flanged clutch jaws 31, and the reaction vanes R and $R_a$ are integral with the casing 100.

Shaft 20 is splined to accommodate slider 30 having jaws 32 mating with jaws 31.

Fork 41, pivoted at 42, meshes and demeshes the jaws 31 and 32. The clutch jaws are inclined on their adjacent facing tooth ends so that when jaws 32 are rotating faster than jaws 31, if the slider 30 is moved toward mesh, a rejection of engagement occurs by reason of the axial force developed by the inclined tooth ends acting as cams. However, if the jaws come to synchronism, the rejection force disappears and the teeth mesh upon finding registry. If jaws 31 are rotating faster than 32, meshing motion of slider 30 would cause a crash engagement, which condition is avoided in the operation of the controls described following.

The applicant's Letters Patent, U. S. 2,341,163 issued February 8, 1944, in Figs. 6 and 7 shows an engine flywheel 1a equipped with a dual clutch control, loaded by a disc spring 170 operated by a sliding bearing from a shaft 180. This clutch system connects the engine to the output sleeve 9 or to the impeller 40 of the torque converter.

The present dual friction clutch system and control resembles this earlier device, but avoids the difficulties experienced with the one-way clutch 18, 19, 21 by substituting therefor the jaw-clutch 31—32, controlled by the mechanism which controls the dual friction clutch. With the present device, the operation of the dual clutch control simultaneously controls the jaw clutch 31—32, so that disengagement of the turbine clutch plate 17, automatically disengages the jaw clutch, and vice versa.

The drum 21 supports presser plate 22 for axial travel and shaft 20 carries splined hub 16 and clutch disc 15. Rotating on shaft 20 is the hollow shaft 18 carrying splined clutch hub 14 attached to clutch disc 17. The clutch system is made alternatively operative for engagement of the clutch discs 15 and 17 but in addition to the above-noted patent disclosure, the jaw clutch 31—32 is provided with a cooperative control.

Figure 2:
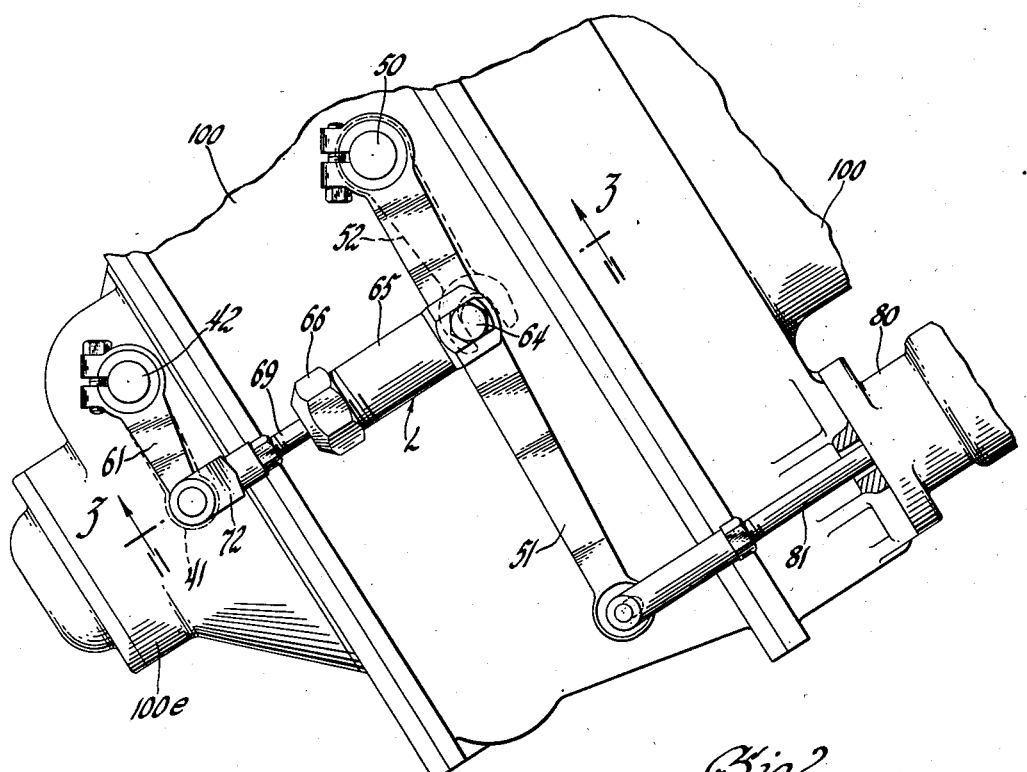
Figure 2 is an outline drawing of the upper portion of the assembly shown in Figure 1, to indicate the relationships of the external controls for the clutching mechanism.

Fig. 2 is an external view of the operating mechanism for the clutch system of Fig. 1.

Shaft 50 is supported in the casing 100, and carries external lever 51 and internal fork 52 for moving the collar pins 53 which shift the inner action portion of the clutch loading disc spring 24. Rocking the lever 51 anti-clockwise causes the disc spring 24 to exert a pull to the left on the presser plate 22 of Fig. 1 clamping disc 17 of hollow shaft 18 and imparting engine rotation to the impeller I. Rocking lever 51 cockwise in Fig. 2 clamps disc 15 between presser plate 22 and the drum 21 imparting engine rotation to solid shaft 20 of Fig. 1 for direct drive.

Shaft 42 mounted parallel to shaft 50 carries attached fork 41 for jaw clutch slider 30, and its external arm 61 is moved with lever arm 51 of shaft 50 through the agency of flexible link mechanism L.

Figure 3:
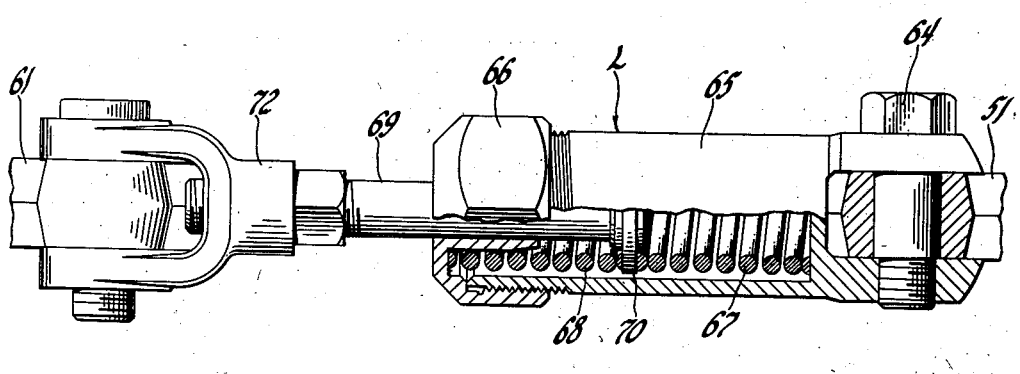
Figure 3 is a detailed view of the link construction shown in Fig. 2, and sectioned in part for clarity.

Fig. 3 shows how this link mechanism is constructed. Arm 51 is recessed for clevis pin 64 of clevis barrel 65, screw capped at 66 to contain springs 67 and 68, and plunger rod 69, the plunger head 70 being located between the inner ends of the springs. The rod 69 has clevis 72 pivoted to arm 61 of shaft 60 of the jaw clutch fork 41.

Anti-clockwise movement of lever arm 51 to engage the turbine clutch plate 17 exerts a pull to the right in Fig. 1 on the jaw clutch slider 30, the lost motion spring 68 compressing and yielding until the jaw teeth 31—32 mesh at synchronism, when the turbine input and output are each then connected to engine and load shafts, respectively.

During a synchronous mesh rejection by the jaw teeth 31 and 32, the springs 67—68 of the device L yield and as mesh occurs, they re-center the plunger head 70.

Clockwise motion of lever arm 51 to disengage the turbine clutch 17 may continue, so that while torque on the flat sides of teeth 31—32 is sufficient to resist demeshing, the removal of torque on the impeller I leaves only the drag torque of the spinning output vane wheels to be overcome. For the case of the reverse torque efficiency of a turbine torque converter being of low value, the demeshing force requirement for slider is only a few pounds, so that if desired, this operation could proceed manually. Such a manual means to move a similar slider manually is commonly known in this art.

Experience with the above described drive and control mechanism has shown that the simultaneous control of the turbine input clutch 17 and the output clutch 31—32 is foolproof and simple. Since at the engagement interval for the turbine the vehicle is either standing still, or in motion with the output shaft tending to slow down, so as to necessitate a shift from direct drive, the helical angle on the camming ends of the jaw teeth is taken so that mesh rejection occurs when the output shaft 20 is rotating faster than the turbine output rotors R. The closing of the turbine input clutch 17, with release of the direct drive clutch 15, permits the vehicle load to slow down shaft 20, while applying engine speed to the impeller I. Since the torque converter is under no load, the impeller force quickly spins the output rotors R and clutch jaws 31 from zero to synchronous speed with jaws 32 rotating with shaft 20.

Figure 4:
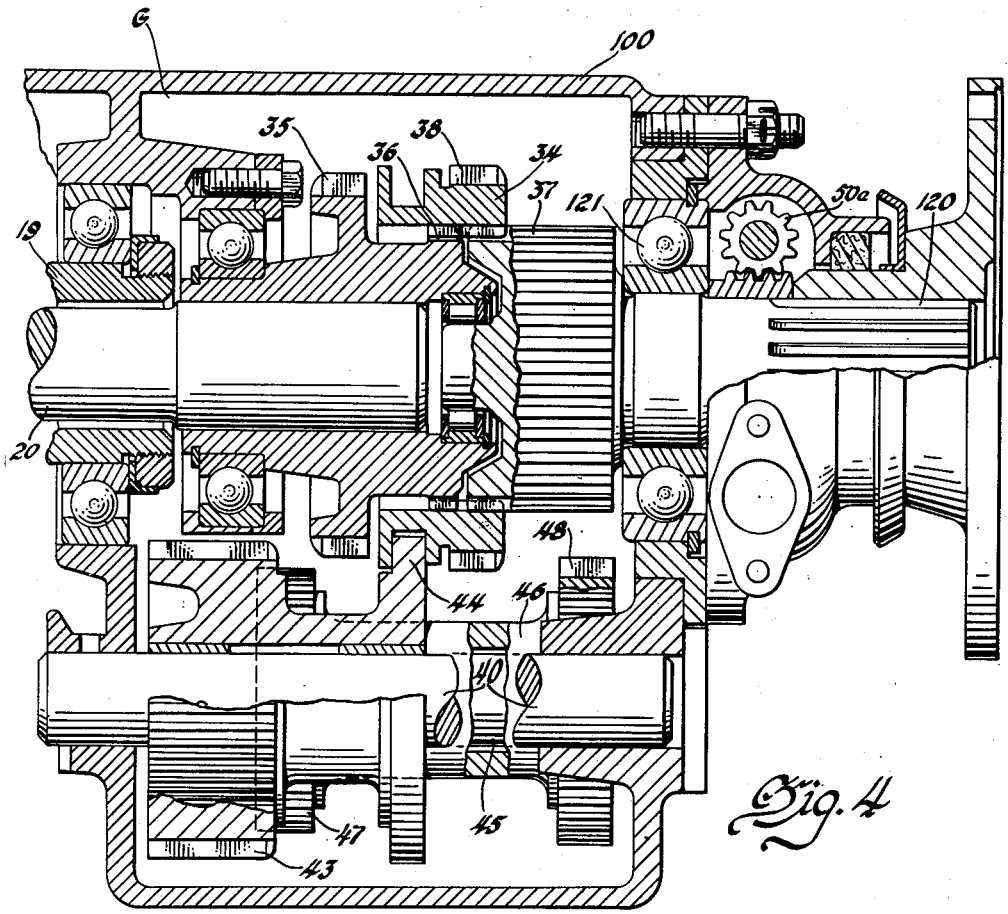
Figure 4 is a longitudinal section through the forward and reverse gear box shown in Fig. 1, but taken to give the details of the relationships among the gears of that assembly.

The forward and reverse gearbox shown in detail in Fig. 4 consists of main shaft 20, and output shaft 120 supported in the bearings shown, in casing 100, and piloted by bearing 121. The shaft 20 has affixed gear 35 and ring of teeth 36, while output shaft 120 has affixed toothed member 37 upon which slider gear 38 is mounted for unitary rotation.

The countershaft 40 supports sliding gear 43 having projecting flange 44 spaced between the flanks of the fork collar of gear 38.

As shown in Fig. 4, the slider 38 couples shafts 20 and 120 at one-to-one ratio, while the counter gear assembly comes to rest.

The idler shaft 45 supports idler body 46 having two rings of teeth 47 and 48. Body 46 does not slide axially. The centers of shafts 20 and 40, 45 and the axial spacings of the gears are so taken that slider gear 38 of shaft 120 may mesh with teeth 48 of idler 45 when the slider 38 is moved to the right. The counter gear 43 of shaft 40 is always mashed with teeth 47 of the idler 46. Shifting of slider 38 from the direct drive position shown, to the right, disengages the internal teeth of slider 34 from teeth 36 for neutral, subsequent movement to the right by slider 38 pulls gear 43 into mesh with gear 35, when the teeth of 43 and 45 have entered, the slider teeth 38 mesh with idler teeth 48.

In demeshing reverse, the slider teeth 38 first disengage from teeth 48, then counter gear 43 releases from idler teeth 47 as the slider moves to full engagement of the direct drive teeth 34 and 36.

This method avoids the churning losses ordinarily found in standard gearboxes, by having the counter gear and idler assemblies come to rest during forward drive, and the staging of the pick-up of the first idler gear prior to the connecting of the other idler gear with the output shaft is a useful feature in that it permits prior unloaded rotation of body 46 for mesh of 38—48, which latter occurs with the vehicle standing still, and with no torque on the shaft 20.

The external control for the drive mechanism may be simple, and be reduced to the operation of only one control actuator element, in the present instance, lever arm 51, for direct drive shift.

There is one precaution to observe. When shifting from converter drive to direct drive, it is expedient to assure full release of the jaw clutch 32 prior to engagement of direct drive, otherwise it may be difficult to declutch the jaw slider 30, since the drag torque on the output rotor could rise with increased engine speed to nearly maximum. This is obviated by adjusting the throw distances and timing of the control lever and link system, and by having the springs 67 and 68 of a given force and abutment factor so that the desired sequence of action obtains.

The net motion for shift between converter and direct drive is small for the upper end of lever arm 51 as noted by the markings in Fig. 2. Fluid servo cylinder housing 80 is bolted to casing 100 and servo piston rod 81 is clevised to the upper end of lever arm 51.

The control diagram of Fig. 5 shows the application of fluid servo force to piston 82 of rod 81 in cylinder 80, for opposing spring 83 and moving lever arm 51 to direct drive position.

The air supply tank A is automatically kept filled and feeds the clutch control system through magnet valve V, the piping 110 connecting tank A to valve V and piping 111 connecting valve V to servo feed line 112.

The fluid servo system utilized to actuate the forward variable speed ratio changes also is used to overcontrol the engine throttle, and to restore same at completion of the shift action. The ratio controls are automatic, by output speed governor, modified by accelerator pedal position, and the control functions are executed electrically.

The control system herein resembles that of my Letters Patent U. S. 2,322,479, issued June 22, 1943. In this patent, I show an electrical dethrottling device serving the purpose of facilitating mesh and demesh of a jaw clutch, with a switch interlock system normally de-energised and activated only when a shift interval is in progress; and an automatic accelerator pedal and governor ratio selection arrangement coordinating pedal position and vehicle speed.

In my application for Letters Patent, Serial No. 507,204 filed October 21, 1943, I show a fluid pressure dethrottling and restoring device operated by the fluid pressure actuating the ratio clutch shifter mechanism, utilized for speeding up the shift interval and avoidance of high differential speeds on the clutch members, and an automatic ratio selection system controlled by vehicle speed and by accelerator pedal position. This application shows a control system more nearly resembling that of the instant disclosure. The latter includes some new features designed to render the operational control more exact and better adapted to the problems involved in handling large vehicles, based on experience with the preceding described forms.

A method of operation of this double clutch control apparatus is also described in my U. S. Letters Patent No. 2,308,113, filed October 4, 1940, and issued January 12, 1943, and shown in Figure 6 of that patent.

Admission and control of fluid pressure to the working face of piston 82 is obtained by the arrangement of Figure 5, a diagram of the fundamental elements and units required.

The clutch shifting piston 82 is shown in cylinder 80 ready for rocking the clutch operating lever 51 toward the position in which the collar 25 of Figure 1 shifts the spring 24 to load clutch plate 15.

Energisation of the magnet valve V, such as is shown in Fig. 3 of my U. S. Letters Patent No. 2,322,479, causes delivery of reservoir supplied pressure to the cylinder 80 for loading the piston 82 against spring 83, and de-energization causes shutting off of the reservoir pressure and releases pressure from cylinder 80, to permit spring 83 to shift the piston 82 to the left.

The magnet valve shown in Fig. 3 of my prior Patent U. S. 2,322,479 is composed of coil 179 which when energised by current admits pressure from pressure feed line 120 to clutch servo cylinders 125 and 130, and when the circuit is broken, shuts off the feed pressure and exhausts the clutch servo cylinders 125 and 130. The valve V herein similarly admits fluid pressure from pipe 110 to clutch servo line 112 when current is delivered to its coil, and similarly exhausts the clutch servo line 112 and connected passages when the circuit is broken. It has not been deemed necessary to show the interior parts of the magnet valve V since they are exactly the same as in the aforesaid Figure 3 of applicant's Letters Patent U. S. 2,322,479. When the circuit from the electrical power source is closed thru the magnet coil of valve V the reservoir pressure of line 110 is admitted to line 112 as noted above, and when the circuit is broken by opening of one of switches S–5, S–3, S–4 or S, the valve resets so as to vent the line 112 at the exhaust tube (not numbered) and shut off feed line 110.

Electric current supply to the magnet valve V passes through stop switch $S^1$, and gear lever switch $S^2$ from the battery; and also passes through overrule switch $S^3$ and governor switch $S^4$.

To obtain positive neutral, the piston rod 81 is stopped at neutral by the swing stop 107 which intersects the travel of lever 51 when air pressure shifts the piston 82 toward direct drive position, and when current flows in solenoid 108.

Fluid pressure delivered by magnet valve V to line 112 reduces the engine throttle setting, the small piston 114 of cylinder 115 having rod 116 linked to bellcrank 117 pivoted to rod 119 of the throttle control, and operating through the body of spring 121'. The clutch operating cylinder 82 is ported to air line 113, connected to the left portion of the throttle control cylinder 115, so that when the clutch piston 82 moves to the right beyond the port of line 113, the pressure may flow to the leftward face of piston 114, equalizing that exerted on its rightward face, whereupon the restoring spring 121' returns the throttle rod 119, bellcrank 117 and rod 116 to original position.

Electric current in one path passes through the master switch S, convenient to the operator, to the governor switch $S^4$, overrule switch $S^3$ and magnet valve V; the other path leading from the battery "hot" side to the gearshift lever switch $S^2$, solenoid stop switch $S^1$ and magnet valve V.

For governor-overruling control, the accelerator pedal 200, operates lever 201, rod 202 bellcrank 203 and the rod 204 of lost-motion device U, the plunger of which is attached to rod 205 of arm 117b of bellcrank 117 controlling the throttle rod 119. The springs 121'' normally transfer thrust between rods 204 and 205.

At full throttle setting, the pedal 200 strikes overrule spring 220 mounted under it on the floor board, which increases the pedal resisting force, but the lost motion device U opens the overruling switch $S^3$, breaking the circuit to the governor and magnet valve V, which causes a transfer of drive from direct-drive clutch plate 15 to torque converter plate 17.

When the vehicle is at rest, engine running, with the operator's master switch S normally closed, the gear lever 240 of Fig. 5 being moved to forward drive position, engages the slider 38 of Fig. 4 with the teeth 36 of member 35.

Depression of pedal 200 to advance the engine throttle causes the torque converter to deliver torque to shaft 20, since clutch plate 17 is normally engaged.

The governor 250 of Fig. 5 driven by gear 50a of Fig. 1 closes switch $S^4$, the battery current passing through normally closed overrule switch $S^3$ to magnet valve V, which being energized, opens reservoir pressure to cylinders 80 and 115. The clutch piston 82 moves right to rock lever 51 to release clutch plate 17 and engage direct drive plate 15 while piston 114 first moves left in cylinder 115, to close the throttle momentarily. As soon as piston 82 uncovers the port of line 113, the air pressure equalizes on the faces of piston 114, and spring 121' re-opens the throttle.

The drive continues in direct drive, unless the speed of governor 250 falls sufficiently to open the switch $S^4$, whereupon the magnet valve circuit is broken, and the valve V shuts off the reservoir and releases the pressure in clutch cylinder 82, so that spring 83 resets the clutch arm 51 and collar 25 of Fig. 1 to load clutch plate 17 for drive through the converter.

Momentary idling of the throttle during upshift to direct drive by means of the control serves to shorten the shift interval during which excess drag wear of the friction clutches would otherwise occur. Experience shows that it is not necessary to apply the reactive control upon the engine throttle during the downshift to converter drive, with this drive construction.

Moving of the accelerator pedal 200 to beyond full throttle may at any time break the circuit to the magnet valve V, by opening the overrule switch $S^3$ and thereby set aside the action of the governor 250. The driver therefore, has the option of initiating downshift to converter drive by pedal advancing movement, due to the feel provided by overrule spring 220. The connection of the pedal 200 to the lost-motion device U, and to the overrule switch $S^3$, and the force of spring are so arranged that the operator feels a definite resistance to further travel of pedal 200, just before the mechanism would open switch $S^3$. This pedal-overruling action may be adjusted to occur at full throttle setting, beyond, or somewhat below, in accordance with the selected drive and engine characteristics. As described again, a preferred arrangement is to have the downshift-by-pedal effect occur somewhat beyond the full throttle pedal setting.

While the fluid pressure is sliding the piston 82 to the rightward position in Fig. 5 as for direct drive, the swinging stop 107 may abut lever 51 while solenoid switch S' is closed at a travel point of piston rod 81 equivalent to a release position for both clutch plates 15—17. Closing of switch $S^2$ energizes 108, as the gearlever 240 is moved.

The above described disclosure represents a continuation in part of the subject matter of my application for Letters Patent, Serial No. 299,643, filed Ocober 16, 1939, in particular the showing of Figures 16 and 17.

Referring to Figures 6 and 7, rod 230 is connected to bellcrank lever 231 of Fig. 7, pivoted to rod 232 extending through the floorboards and pivoted to arm 233 of part 234 of Figure 7; and rocks bellcrank 235 pivoted to rod 236 having connection with the arm of shifter fork 237.

The gear lever 240 of Figure 7 is fastened to shaft 239 rocking with mounting 234 located forward in Fig. 7, at the operator's station. The lever 240 and member 234 rock fore and aft, the pivoted mounting of the lever 240 permitting a small lateral motion of the member 234. The lever 240 is guided in the E-slot of the upper portion of the casing 238 for reciprocation, and for lateral motion into the slot passages "F," "N" and "R" for forward, neutral and reverse shift operation.

The switch $S^2$ of Fig. 5 is supported adjacent the lever 240, which is biased toward the gear station positions by spring 240a. The swinging stop 107 of S' always protrudes in the path of the lever 51 and rod 81, whenever the gear lever 240 is in the left, or continuous portion of the E-slot, with switch $S^2$ closed. This halts the piston 82 of cylinder 80 in mid-position or neutral, as the pressure to the left of the piston 82 in Fig. 5 causes it to shift to the right.

The lever 240 thru rod 230, mechanically operates slider 38 of Fig. 4 by appropriate linkages, and its action constitutes an improvement over the arrangement of Fig. 9 of my Letters Patent U. S. 2,322,479.

The diagram of Fig. 5 shows a swinging stop 251 pivoted to block the release of jaw clutch slider 30 so that the driven members of the fluid torque converter may be required to rotate when the controls are set for direct drive under overtaking torque, to provide braking effect.

Fig. 8 shows a mechanical linkage between the lever 260 in the driver's station and the swinging stop 251 located on the gearbox adjacent lever 61 of shaft 42 which controls the jaw clutch slider 30. The short arm 260a of lever 260 is pivoted to rod 257 of bellcrank 256 operating rod 255 bellcrank 254, and rod 253 attached to the arm 251a of stop 251.

With handle of lever 260, as shown, the jaw clutch 31—32 is held engaged, and swung toward the left lifts rod 255, rotates member 254, exerts a pull on rod 253, to rock stop 251 out of the way of lever 261 so that spring 67 may transmit force from lever 51 to release jaw 32 from jaw 31.

This mechanism permits the direct drive clutch 15 to be engaged while connecting turbine output member O to the load shaft 20 for a braking effect derived from the resistance of the fluid in the torque converter.

From the foregoing, it is believed that a clear understanding is given of the mechanism herein describing the invention, and its operation, especially in view of the references provided to the earlier filed applications and patents of the applicant herein.

As outlined preceding, no claims are herein directed to the claimed subject matter of the applicant's patents and applications referred to, nor do the claims hereunder describe the inventions of said earlier filed applications. The present application is more directly concerned with the improvements provided here, and which produce new and useful results by the utilization of the features and expedients believed here disclosed for the first time. Attention is especially directed to the advantages provided in the new clutch control arrangement, which obviates the difficulties formerly experienced with overrunning clutches in drives of this type, and which yields a very positive control of the driver over the movement of the vehicle at all times.

The particular arrangement of the forward and reverse gear unit which provides a complete idling of the countergear system during forward drive, is thought to possess points of novelty, as described in the claims to follow. It is likewise believed that the added control described in connection with Fig. 8 for giving a new safety braking factor in negotiating hilly country, is of further utility and advantage over devices in this field disclosed in the prior art.

The control arrangement shown in Fig. 5 wherein the dynamometric pressure responsive switch $S^6$ acts to sustain a higher ratio drive over low speeds and torques of the vehicle provides obvious advantages in lessening the wear and tear on the automatic shifting and selecting mechanism for the transmission assembly. The solenoid operated mechanism for establishing neutral drive through the positioning of the clutch actuator element 51 in Fig. 5, in conjunction with the positioning of the hand lever 240, for its operation of the switch $S^2$ is felt to be of importance in the overall combination, as herein described and claimed. The switch $S_5$ consists of a bellows type contactor spring loaded to release the circuit between $S_3$ and $S_5$ at low fluid pressures within the working space of the torque converter, the unnumbered pipe being open to the circuit flow space within the housing T of Fig. 1.

There are further advantages having to do with structure such as that of the unit shown in Figs. 4 and 1 in section, but more particularly in Fig. 4 which have to do with the relative longitudinal spacing of the supporting bearing such as 121, the overhanging portion of casing 100 at the opposite end of the unit adjacent gear 43, and the sequential staging of mesh and demesh operation of the sliders 44 and 34 with respect to the reverse idler having rings of teeth 47 and 48.

In the preamble to the specification I provide a series of generalized statements setting forth the utility and the objects of invention which features are claimed below, and are believed to represent novel contributions to the art for not only the space arrangement of the drive elements, but also the interlinked and interlocked controls, both manual and automatic, from which are derived new factors of higher safety and increased assuredness of operation in the heavy vehicle field, in particular where the demand for higher road speeds and faster ratio changing operations in city traffic have become increasingly high.

While I have pointed out in the foregoing specification certain novel features of invention, it should be clearly understood that various omissions, substitutions and changes of form and detail from the illustrative showing here, and in the operational relationships thereof may be made by those skilled in the art without departing from the scope of the invention.

Having thus described my invention, I claim:

1. In compounded fluid and mechanical variable speed ratio transmissions, a variable speed transmission assembly including a fluid torque converter adapted to transmit the drive of an engine to a selective forward and reverse gear unit coupled to a load shaft, an engine shaft, an impeller member of said converter, an input member for said unit, actuable clutching means coupling said engine shaft alternatively with said converter impeller or with the input member of said unit and including a clutch operative for coupling the output of said converter to the input member of said unit, controlled actuating means for said clutching means operable to effect the coupling of said engine shaft directly with said unit input member and to disconnect said converter, or operable to decouple said engine from the input of said unit while coupling the input of said converter to said engine and the output of said converter to the input of said unit, and control means effective to cause said actuating means to perform said coupling and decoupling.

2. In the combination set forth in claim 1, a valve included in said control means for said actuating means, a controlling device for said actuating means, a connecting linkage between said movable member and said device effective to prevent operation of said actuating means when said member is moved to a predetermined position.

3. In the combination set forth in claim 1, a power operated member included in said actuating means and power controls for said member included in said control means, the action of said member being effective upon a predetermined setting of said control means.

4. In the combination set forth in claim 1, a positive jaw clutch included in said clutching means which is operative for coupling the output member of said converter to the input member of said unit, said jaw clutch having an operating link operated by the said actuating means during the coupling and uncoupling by said clutching means of said engine and said unit input member.

5. In the combination set forth in claim 1, a positive jaw clutch included in said clutching means and having teeth abutting during engagement and inclined to facilitate mesh for smooth transfer of torque between the said torque converter output and the said unit input.

6. In the combination set forth in claim 1, torque supporting gearing in a casing containing lubricant included in said unit and also including jaw clutch elements in said unit adapted to transmit forward or reverse torque to said load shaft, said elements being arranged for direct drive between said unit input member and said load shaft and for geared reverse drive therebetween, and of said elements providing said direct drive while the reverse drive elements come to rest, whereby power loss from churning of lubricant by idling gear elements is avoided.

7. In a power transmission assembly for vehicle drives, a gear casing, a forward and reverse gear unit in said casing having a power input shaft, a concentric load shaft and a parallel countershaft, a gear mounted on said power shaft, a second gear mounted to slide on splines on said load shaft, a reverse idler gear body having two rings of teeth and mounted on a shaft parallel to said other shafts, a sliding gear member mounted on said countershaft and constantly meshed with one of said idler rings of teeth, an arrangement of longitudinal spacing of said gears and said rings of teeth such that when said second named gear is moved longitudinally toward the point of emergence of said load shaft from said casing, the gear meshes with one of the rings of teeth of said idler, and a connection coupling the said second gear with the said sliding member of said countershaft effective to mesh said second gear with said member and thereby convert a forward torque component applied to said input shaft into a reverse torque component on said load shaft.

8. In the combination set forth in claim 7, mating jaw teeth on said first and second gears to provide direct drive between said input and output shafts, a slider mechanism to slide said second gear toward mesh thereof from the reverse drive position stated in claim 7, and longitudinal spacing of said gears and said rings of teeth such that said second gear and said countershaft gear are both demeshed from the teeth of said slider prior to mesh of said jaw teeth providing the said direct drive.

9. In the combination set forth in claim 7, a common control means for said first named sliding gear and said countershaft gear, an arrangement of longitudinal spacing of said gears and said rings of teeth such that upon movement of said sliding gears toward mesh with the said rings of teeth of said idler, the said countershaft gear first meshes with said first named input shaft gear, before subsequent mesh of said second named gear with the corresponding teeth of said idler.

10. In the combination set forth in claim 7, the said casing having a rear end bearing supporting the said output shaft, and adjacent splines on said output shaft extending longitudinally toward said bearing and occupying the full co-planar zone in which lies the said second ring of teeth of said reverse idler gear.

11. In the combination set forth in claim 7, said casing having a fore-end bearing supporting the overhanging portion of said power input shaft upon which said first gear is mounted, and the said countershaft gear occupying a position approximately co-planar with said fore-end bearing when said second gear is moved oppositely to the position stated in claim 7.

12. In power transmission devices, an engine, an engine speed control, an engine shaft, a variable speed drive assembly driven by said engine shaft comprising concentrically placed power and load shafts adapted to be coupled directly or indirectly by a fluid torque converter, clutch means operable to couple said last named shafts and said converter, selectively operating controls for said clutch means arranged to establish alternate direct drive or converter drive thereby, a clutch included in said clutch means and connected to said selectively operating controls for coupling the said load shaft with the output of said converter and for releasing same in response to predetermined selective operation of said controls a control link for operating said clutch connected to the said selectively operating controls providing an engaging and disengaging force conjointly with engaging and disengaging force applied to another clutch of said clutch means, and of meshing positive jaw clutch teeth forming the torque-supporting connection between the said converter output and the said load shaft.

13. In the combination set forth in claim 12, a force-applying means for said clutch means consisting of a fluid servo piston and cylinder for operation of said clutch means to provide selective actuation for one coupling drive combination and opposing spring means operative to store energy for another coupling drive combination of said clutch means, and control means operated by said controls operative upon said force-applying means and effective to apply a reactive force to said engine speed control for predetermined selective operations of said controls involving the action of said clutch coupling the load shaft with the output of said converter.

14. In the combination set forth in claim 12, a device responsive to the speed and torque operating conditions of the said torque converter and a connection from said device to said controls for superimposing a ratio selecting and holding effect thereupon for certain values of said converter speed and torque expressed upon said device.

15. In power transmission controls, for motor vehicles, a transmission assembly providing selective and automatic actuation of a plurality of clutches for coupling a power shaft and a load shaft at variable speed ratios consisting of a variable speed drive device having input and output members, a gear unit having input and output members, said gear unit output member being connected to said load shaft, a clutch adapted to connect said power shaft to the input member of said device, a second clutch adapted to connect said power shaft to the input member of said gear unit, an actuator mechanism for said first and second clutches operable for alternate engagement of the clutches and movable between clutch engaging positions wherein both clutches are disengaged, a control for said mechanism responsive to the speed of one of said shafts and operative to cause alternation of said clutch engagement, and a manual control element connected to said mechanism control operative to interfere with the automatic release of one of said clutches by mechanical blocking of movement of said mechanism toward released position for said one of said clutches.

16. In control mechanisms, in combination, a variable speed ratio transmission assembly adapted to connect input and output shafts and including a variable speed drive device having an output member and an input member, a gear unit having an input member adapted to be driven by said device output member and having an output member rotating with said output shaft, plurality of engageable and disengageable clutches one of which is arranged to connect said input shaft with said device input member and another of which is arranged to connect said input shaft with the said unit input member, a movable element for actuation of said clutches for establishing drive in one speed ratio or another between said shafts, forward and reverse drive paths provided by said gear unit for coupling said output shaft to a load shaft, a movable control member for said unit operable to select the drive thru said path, control means for said clutches, connections between said means and said control member effective to compel a predetermined setting of said clutch actuation element in response to a selected positioning of said member and a separate control mechanism likewise operative upon said element for independent setting thereof in response to the positioning of said mechanism.

17. In the combination set forth in claim 16, a fluid pressure actuator connected to said element for moving it to the said clutch drive and release positions, of valves controlling the operation of said actuator and subject to the action of said member thru the agency of said connections, and of a mechanical relationship between the motions of said element and said mechanism effective to oppose the clutch actuation by said fluid motor thereon for a predetermined positioning of said mechanism.

18. In power transmissions for motor vehicles, an automatically operable variable speed transmission assembly adapted to connect power input and output load shafts and including a fluid torque converter operative to transmit multiplied variable torque between said shafts, said converter including an impeller member, an output turbine member and a torque-reaction sustaining member, said members being enclosed in a housing within which a fluid pressure is generated varying with the transmitted torque and the relative member speeds of the converter, clutch means operative to connect said shafts directly or thru said torque converter impeller and turbine members, control means for said clutch means operative to select actuation of said clutch means and a device connected to a pressure space within said housing subject to the variation of pressure therein created by rotation of said members and said device also being connected to said clutch control means for superimposing the effect of the fluid pressure so derived upon the selective action of said control means.

19. A power transmission mechanism enclosed in a housing and coupling input and output shafts at variable speed ratios, said mechanism including rotating members immersed in a fluid body contained in said housing and thereby generating within said housing a fluid pressure varying with the speed and torque of said shafts, power transmitting members of said mechanism selectively operable to provide selective paths of torque between said shafts and actuators for moving said members so as to establish the selective drive of said members automatic ratio controls for said actuators including an element operably responsive to varying speeds of one of said shafts, and a device responding to the said varying pressure within said housing and effective to modify the speed-responsive operation of said automatic controls, effective to establish speed responsive control of ratio within one pressure range of said device and for modifying the said speed responsive ratio change action at a different pressure range of said device.

20. A motor vehicle, an engine, a power transmission for driving said vehicle from said engine embodying a fluid turbine torque converter having input and output rotor members adapted to transmit variable torque between power and load shafts, clutching mechanism arranged to connect the said members with said shafts respectively, a clutch adapted to connect the shafts directly, selectively operable actuators for said mechanism and said clutch, a control device for said actuators effective to cause alternate engagement of said mechanism for drive by said converter or engagement of said clutch for direct drive between the said shafts, and a selective control cooperating with said device subject to manual operation and acting upon the said actuator for said mechanism effective to maintain the connection of said converter turbine with the said load shaft during the period when said clutch actuator is causing the clutch to connect the shafts directly, therefore providing the useful result of a braking effect upon the said load shaft in accordance with the selective action of said cooperating control.

21. A fluid turbine torque converter adapted to connect power and load shafts having an input impeller and an output turbine member, clutch mechanism for establishing said connection, a clutch for connecting said shafts directly, an actuating device for said mechanism and said clutch effective for establishing alternate drive either by said mechanism and said converter or by said clutch between said shafts, and a selective control subject to operator manipulation operative to prevent said mechanism from disengaging the torque of said output turbine member when said clutch is engaged by the action of said device.

22. A power transmission system for connecting power and load shafts including a fluid turbine torque converter having an impeller and a driven turbine, clutch mechanism for connecting same between said shafts, a clutch for connecting the said shafts directly, actuator linkage normally operable to alternate the drive operation of said clutch mechanism with said clutch, and an interfering control for interrupting the disconnection of the torque of said driven turbine while permitting the engagement of said clutch for the purpose of providing a hydraulic braking effect derived from the resistance of said turbine and acting upon said load shaft.

23. A fluid torque converter having a plurality of bladed rotors enclosed within a housing containing a fluid body in a working space, one of said rotors being an impeller member adapted to generate a circulatory flow within the working space of the converter and another of said rotors being a turbine member adapted to receive a variable torque from the said flow, power and load shafts, drive-connecting clutch mechanism operative to connect said shafts directly or to connect the said impeller and turbine members respectively to said shafts, control devices effective to cause said mechanism to establish said shaft connections selectively, and a pressure-responsive apparatus subject to the pressure generated by the rotation of said rotors within said housing and operative to influence the action of said control devices upon said mechanism.

24. In power drive devices for transmitting variable torque between power and load shafts, a fluid torque converter having an impeller, reaction and output turbine rotor members, settable clutch mechanism for connecting said impeller and turbine members to said power and load shafts respectively, a jaw clutch device of said mechanism arranged to connect said turbine member and said load shaft when said mechanism is set to connect the shafts, said device consisting of mating engageable toothed elements having teeth with flat, torque-driving faces and inclined end portions for rejecting mesh during differential speed intervals of said turbine member and said load shaft for one hand of differential rotation, control apparatus for setting said mechanism to connect said turbine member and said loadshaft including a resilient shifting member operable to bring said inclined end portions of said teeth together for initial contact and further operable to seat the said toothed elements when at synchronous speed for drive on said flat tooth faces, said shifting member being likewise operable to release said elements when said control apparatus is set to release the said impeller and turbine members.

25. A power transmission mechanism enclosed in a housing and adapted to connect power transmitting input and output shafts at selected variable speed ratios, an engine driving said input shaft, a speed control for said engine, speed ratio selection means responsive to the speed of one of said shafts and adapted to change the drive ratio of said mechanism in order to increase said ratio with rise of speed, a connection between said engine speed control and said speed responsive means effective at advanced settings of said engine speed control to select drive by said mechanism at lower speed ratios than those selected by said speed responsive means, and a dynamometric device responsive to the drive speeds and torques of said mechanism operative to prevent the ratio controlling action of said engine speed control and of said speed responsive means during a predetermined range of speeds and torques transmitted by said mechanism.

26. In the combination set forth in claim 25, the further arrangement of said dynamometric device with said mechanism, wherein said mechanism includes a fluid torque converter adapted to transmit torque between bladed members effectively connected to said shafts, through the agency of a circulating body of fluid operating within said converter at variable speeds and pressures, and the arrangement of said dynamometric device including a control element variably responsive to the changes of pressure within said converter operative to prevent change of drive ratio of said mechanism, at pressures below a minimum value, and likewise operative to prevent said change of ratio when the quantity of said liquid body within the converter diminishes below a predetermined amount.

27. A torque-transmitting drive assembly including fluid torque converter adapted to connect power and load shafts, said converter having an input impeller and an output turbine member, clutch mechanism for establishing said turbine connection to said load shaft, a clutch for connecting said shafts directly, a control linkage operable to engage said mechanism and said clutch simultaneously so that the torque upon said mechanism provides a turbine braking effect on the drive of said shaft, and a control member for said linkage, movable to establish said braking effect at the will of the operator.

28. In the combination set forth in claim 12 wherein said control link is effective for operating said clutch and operating said positive jaw teeth which form the said torque supporting connection of said clutch means between the said converter output and the said load shaft; the further combination of actuating means for said control link embodying a resilient lost motion mechanism for transmitting shifting force operative for meshing and demeshing said positive jaw teeth.

HANS O. SCHJOLIN.

REFERENCES CITED

The following references are of record in the file of this patent:

UNITED STATES PATENTS

| Number | Name | Date |
| --- | --- | --- |
| 2,012,340 | Emrick | Aug. 27, 1935 |
| 2,109,610 | Austin | Mar. 1, 1938 |
| 2,178,356 | Brunner | Oct. 31, 1939 |
| 2,280,002 | Neracher | Apr. 14, 1942 |
| 2,282,591 | Orr | May 12, 1942 |
| 2,291,690 | Caves | Aug. 4, 1942 |
| 2,335,926 | Fawick | Dec. 7, 1943 |
| 2,352,478 | Halford | June 27, 1944 |
| 2,369,126 | Baker | Feb. 13, 1945 |
| 2,369,369 | Peterson et al. | Feb. 13, 1945 |
| 2,435,930 | Schjolin | Feb. 10, 1948 |